US010582802B2

(12) United States Patent
Caswell et al.

(10) Patent No.: US 10,582,802 B2
(45) Date of Patent: Mar. 10, 2020

(54) MICROWAVE SPLATTER COVER OR ENCLOSURE

(71) Applicants:ENHANCE PRODUCT DEVELOPMENT, INC., Minneapolis, MN (US); Thomas Grimm, Stillwater, MN (US)

(72) Inventors: Ty Joseph Caswell, Zimmerman, MN (US); Trevor Lambert, Brooklyn Park, MN (US); Thomas Grimm, Stillwater, MN (US)

(73) Assignee: ENHANCE PRODUCT DEVELOPMENT, Minneapolis, MN (US)

( * ) Notice: Subject to any disclaimer, the term of this patent is extended or adjusted under 35 U.S.C. 154(b) by 321 days.

(21) Appl. No.: 15/498,737

(22) Filed: Apr. 27, 2017

(65) Prior Publication Data

US 2017/0354292 A1    Dec. 14, 2017

Related U.S. Application Data

(60) Provisional application No. 62/349,374, filed on Jun. 13, 2016.

(51) Int. Cl.
| | | |
|---|---|---|
| *H05B 6/80* | (2006.01) | |
| *A47J 36/02* | (2006.01) | |
| *A47J 36/04* | (2006.01) | |
| *B65D 81/38* | (2006.01) | |
| *H05B 6/64* | (2006.01) | |
| *F24C 15/14* | (2006.01) | |

(52) U.S. Cl.
CPC ............ *A47J 36/027* (2013.01); *A47J 36/04* (2013.01); *B65D 81/38* (2013.01); *H05B 6/6408* (2013.01); *H05B 6/80* (2013.01); *F24C 15/14* (2013.01)

(58) Field of Classification Search
CPC .......... A47J 36/027; A47J 36/04; H05B 6/80; H05B 6/6408; B65D 81/38; F24C 15/14
USPC ............... 219/734, 731, 732, 735, 729, 762; 220/252, 367.1, 369, 573.1, 574; 99/451; 426/241; 186/49
See application file for complete search history.

(56) References Cited

U.S. PATENT DOCUMENTS

| | | | |
|---|---|---|---|
| 2,731,663 A | | 1/1956 | Thompson |
| 4,917,076 A | * | 4/1990 | Nadolph ............... A47G 19/027 126/246 |
| 5,365,038 A | * | 11/1994 | Mitsugu ................. A47G 19/26 126/246 |
| 5,387,781 A | * | 2/1995 | Berkoff ................... A47J 27/04 219/733 |
| 7,326,895 B1 | | 2/2008 | Henderson |
| 7,482,561 B2 | | 1/2009 | Henderson |

(Continued)

FOREIGN PATENT DOCUMENTS

JP         5553246 B2 *  7/2014

*Primary Examiner* — Quang T Van
(74) *Attorney, Agent, or Firm* — Jimenez Law Firm; Jose W. Jimenez, Esq.

(57) ABSTRACT

Described herein is a reusable microwave splatter cover member with improved ventilation that is storable in the microwave oven on an interior surface via one or more microwave-safe magnets disposed at a portion of the cover member. In related embodiments, the cover member includes one or more removable or overmolded silicone handles as well as protruding handles for improved handling immediately following use in a microwave oven.

21 Claims, 22 Drawing Sheets

(56) References Cited

U.S. PATENT DOCUMENTS

| | | | |
|---|---|---|---|
| 7,766,181 B2 | 8/2010 | Fogle et al. | |
| 8,866,055 B2 | 10/2014 | Davis | |
| 2007/0176506 A1* | 8/2007 | Miekka | H02K 1/17 310/154.07 |
| 2009/0294217 A1* | 12/2009 | Tanaka | A47F 10/06 186/49 |
| 2011/0284566 A1* | 11/2011 | Segal | B65D 41/22 220/796 |
| 2013/0043254 A1* | 2/2013 | Haworth | A47J 36/04 220/573.2 |

\* cited by examiner

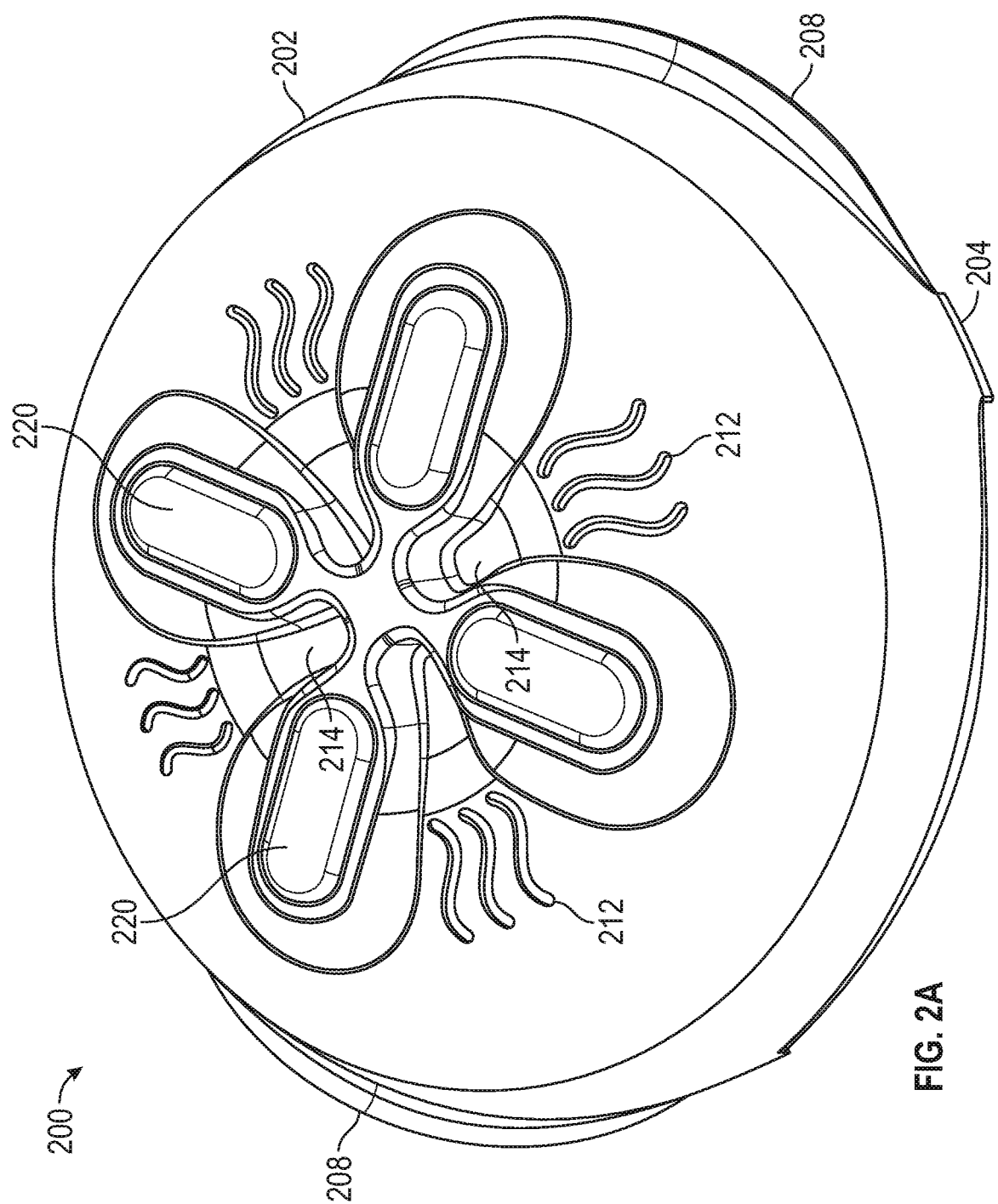

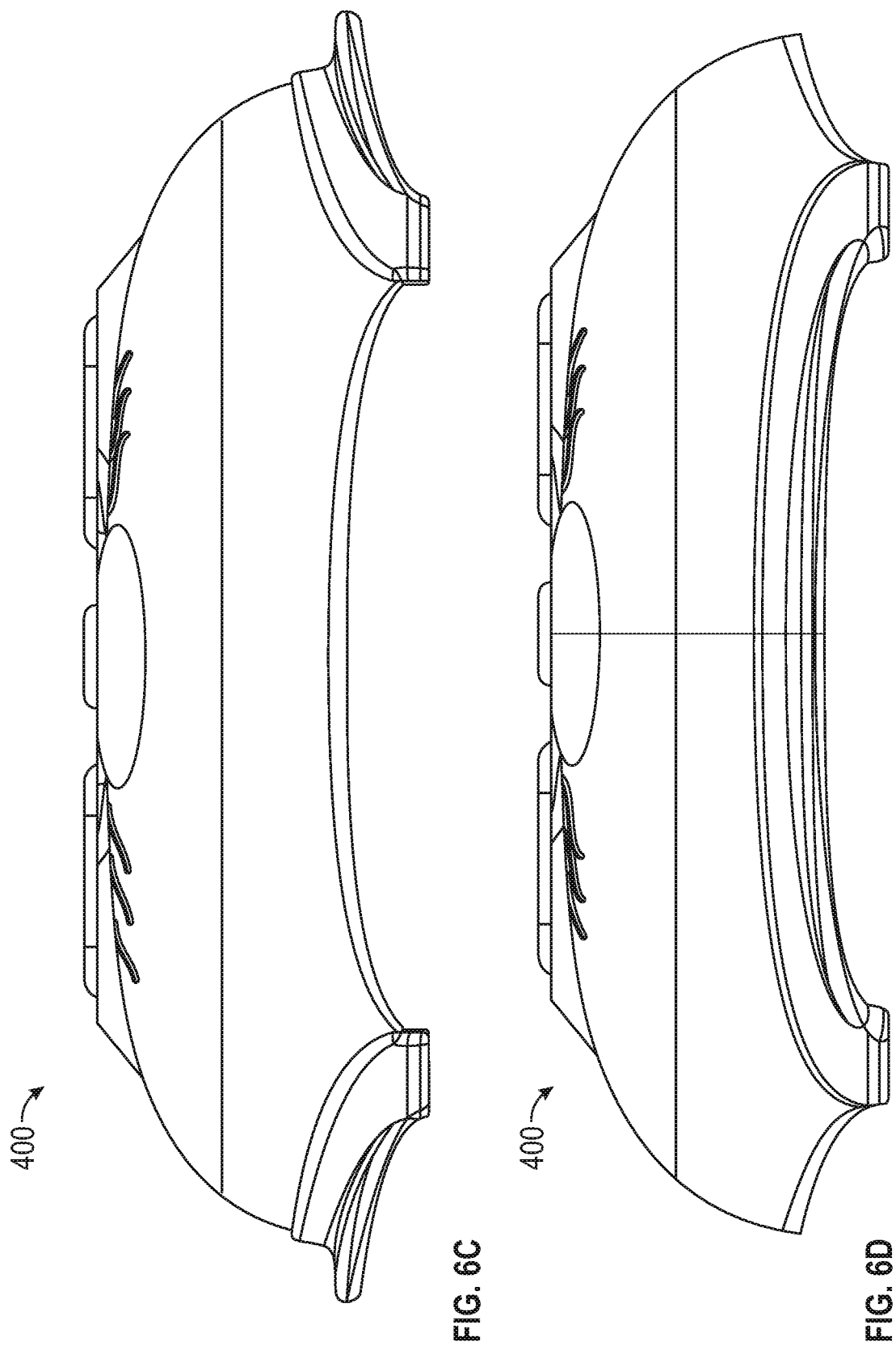

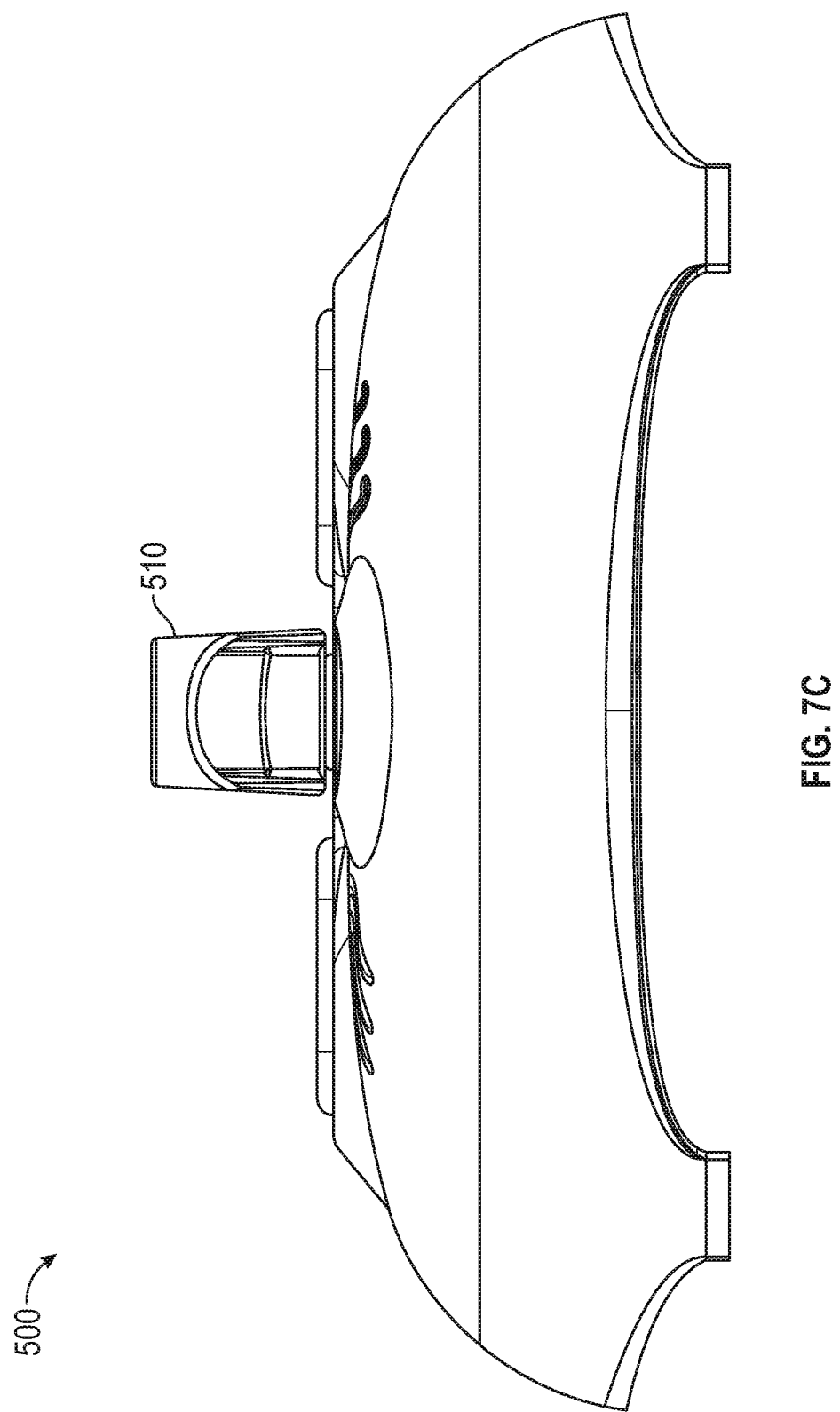

MICROWAVE SPLATTER COVER OR ENCLOSURE

PRIORITY CLAIM

The present nonprovisional patent application claims the benefit of and priority to, under 35 USC § 119(e), U.S. Provisional Patent Application No. 62/349,374 filed on Jun. 13, 2016, entitled "MICROWAVE SPLATTER COVER" the entirety of which is incorporated herein by reference.

FIELD OF THE INVENTION

The invention relates generally to a reusable microwave oven cover device.

BACKGROUND

Currently there are a number of solutions for keeping your microwave clean when cooking items that may splatter during heating. One of these solutions attempts to place a paper towel or cloth over the plate or bowl of food you are cooking, but this approach fails to meet the needs of the market because the paper towel gets into the food making the cooking experience messy or the paper towel falls off especially where you are using a microwave oven that has a rotating carrousel. Another solution is to use a plastic plate cover/splatter guard assembly, but this solution is similarly unable to meet the needs of the market because the plate cover can become extremely hot to the touch and the splatter guard assembly makes the food that you are cooking soggy due to steam building up inside the microwave cover. Further, the plastic plate cover/splatter guard assembly is large and takes up space in the kitchen cabinet when not in use.

There is a need therefore for an apparatus or device or kitchen accessory that prevents food from splattering and making a mess of your microwave oven during the cooking or heating/reheating process.

SUMMARY OF THE INVENTION

In one example embodiment, the invention relates generally to a reusable microwave splatter cover assembly that is storable in a microwave oven when not in use. In this example embodiment, the microwave cover is stored on an interior surface of a microwave oven via one or more microwave-safe magnets that are integrated into the body of the microwave cover. The microwave cover is also storable on an exterior surface of the microwave oven or other appliance.

In another example embodiment, a microwave cover member assembly is provided that includes a housing member having a concave portion with an open end having an outer rim adapted to support the housing member in a face-down configuration. The housing further includes at least one ventilation portion to permit air flow up through the concave portion of housing. The cover member also includes at least one magnetic member integrated into an upper portion of the housing, the at least one magnetic member adapted to facilitate adhering of the housing member to an interior surface of a microwave oven for storage and later use. In related embodiment, the housing is configured as a dome housing.

In another example embodiment, a microwave oven cover member is provided that includes a housing member having a closed end and a concave portion with an open end. The cover member further includes at least one magnetic assembly integrated into the closed end of the housing, the at least one magnetic assembly adapted to facilitate adhering of the housing member to an interior surface of the microwave oven for storage and reuse later. In a related embodiment, the housing includes at least one ventilation portion to permit air flow up through the concave portion of the housing. In yet another related embodiment, the closed end of the housing member has at least one aperture or hole adapted to permit airflow through the concave portion of the housing and to facilitate grasping of the housing member when the open end of the housing is in a face-down position.

In yet another example embodiment, a microwave, electric, or gas kitchen accessory assembly is provided that includes a kitchen accessory selected from the group consisting of spoons, forks, knives, spatulas, tongs, strainers, bowls and colanders; and at least one magnet member integrated into a portion of the kitchen accessory so as to facilitate adhering of the kitchen accessory to an interior or exterior surface of one of a microwave, electric and gas oven, thereby forming the kitchen accessory assembly. In a related embodiment, a system is provided for covering food preparations to prevent splatter during cooking or reheating in a cooking appliance that is selected from the group consisting of a microwave, standard oven, and a barbeque grill as substantially described herein.

It would be advantageous to have an apparatus or device or kitchen accessory that prevents food from splattering and making a mess of your microwave oven during the cooking or heating/reheating process. Furthermore, it would also be advantageous to have an apparatus or kitchen accessory that is vented and also has space at or near a base of the device to allow for maximum venting so less water vapor and droplets accumulate inside the cover from steam generated during the microwaving process. Still further, it would be advantageous to have an apparatus that remains cool to the touch when you remove the microwave device or accessory after the cooking or heating process is complete. Further, it would be advantageous to have a device that can be stored on one or more of the interior surfaces of the microwave when not in use so as not to take up space in a drawer or cabinet. Therefore, there currently exists a need in the market for an apparatus that is a cooking splatter shield or cover member that is used in a microwave oven during cooking and is storable inside the microwave oven appliance after cooking or heating is complete.

The invention advantageously fills the aforementioned deficiencies by providing a reusable microwave splatter cover that is kept in the microwave and stored on the interior surface via one or more magnet, which provides a cleaner microwave and no added clutter storing the cover in a drawer or cabinet.

In one example embodiment of the invention there is described a microwave splatter guard or cover member that stands up above and around an item being cooked. The device remains cool to the touch no matter how long the cooking time and fewer water droplets build up from steam inside the cover. The cover/splatter shield conveniently stores on the inside of microwave with microwave safe magnets. The apparatus has one or more apertures positioned above the food being cooked and is raised at the bottom for enough space to allow for proper venting and prevents steam/water build up making food wet and soggy. The apparatus has handles on the sides and on the top of the device for easy maneuvering and is made of plastic that does not over heat and burn fingers when touched. The apparatus fulfills the need for keeping food from popping and splattering on the ceiling and walls of the microwave oven (or depending on the type of material the cover member is made of, a standard toaster or stove-style oven) so as to make clean up easy.

Among other things, it is an advantage of the various embodiments of the invention describe herein to provide a reusable microwave (or regular oven) splatter cover that is storable in the microwave oven on the interior surface via one or more magnets that does not interfere with the cooking operation of the microwave (or regular oven) and does not suffer from any of the problems or deficiencies associated with prior solutions.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIGS. 2A-2C illustrate perspective, top and side views of another embodiment of a microwave cover member.

FIGS. 6A-6F illustrate a perspective, exploded, front, side, top and bottom views, respectively, of another embodiment of a microwave cover member.

FIGS. 7A-7D illustrate a perspective view, a front view, a side view and a bottom view of another embodiment of a microwave cover member with a removable gripper handle member.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various example embodiments of the invention are generally directed to be a reusable microwave splatter cover member or device or accessory that is storable in a microwave oven and on an interior surface of a microwave cooking space or cavity via one or more microwave-safe magnets integrated or integratable into the microwave cover member. The invention is generally a reusable microwave splatter cover that does not generally become hot during cooking, remaining generally cool to the touch and does not overly steam up inside thereby getting wet and dripping condensation all over the food when the microwave cover is removed from a heating plate or microwave carousel assembly.

Figure 1A:
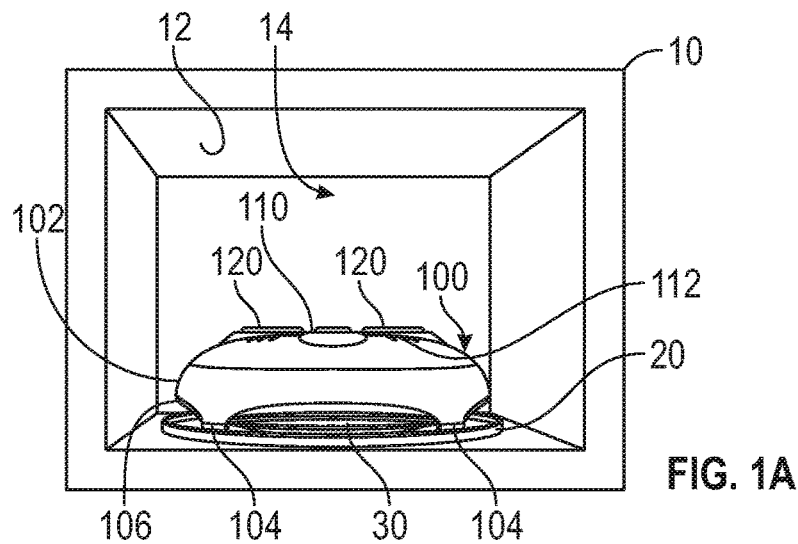
FIGS. 1A-1C illustrate front and perspective views of a microwave cover member or device or assembly in use in a microwave oven.
Figure 1B:
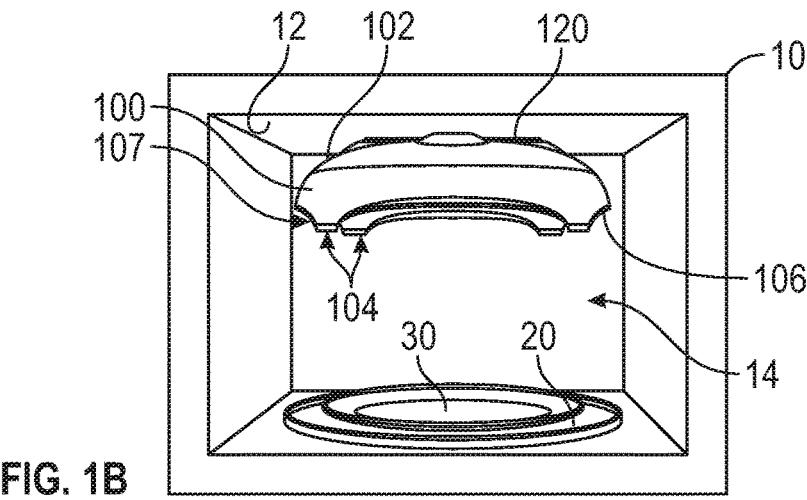
Figure 1C:
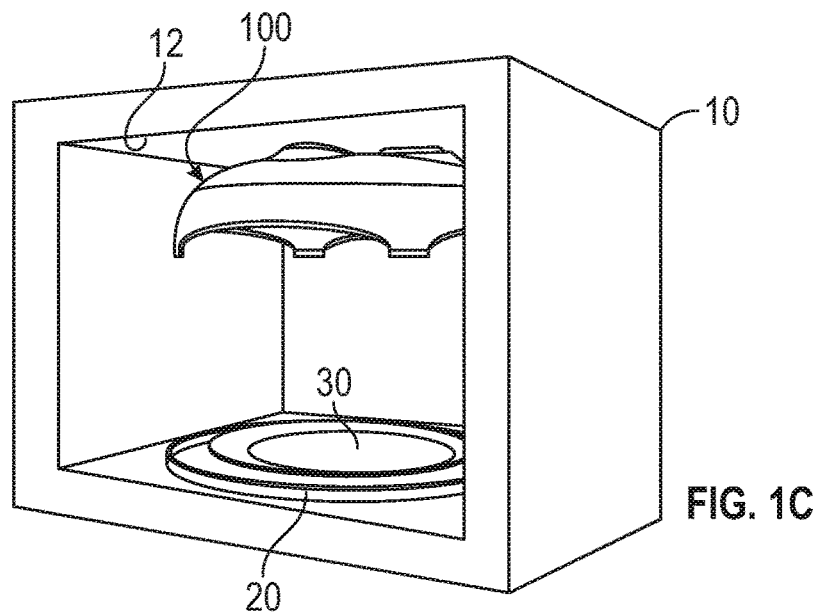

Referring now to the Figures, and in particular FIGS. 1A-1C, there is illustrated in FIG. 1A a front view of a microwave cover member and assembly 100, for use in a microwave oven 10 to prevent splatter within a microwave cooking cavity 14 during cooking. In this example embodiment, microwave cover member and assembly 100 is disposed within a microwave oven 10, having an optional rotatable carousel 20, with cover assembly 100 being disposed over a microwaveable dish or plate 30. FIGS. 1B and 1C illustrate front and perspective views, respectively, of microwave cover member 100 in a storage position on a microwave oven ceiling 12 that is housed within microwave oven cavity 14. In particular, FIGS. 1A-1C illustrate cover member 100 which is one example embodiment of the invention. In this particular embodiment, cover member 100 includes a dome-shaped housing 102 that includes at a concave periphery (away from the top of the dome) a set of leg posts 104 disposed on an outer rim 106 of dome housing 102. Leg posts 104 protrude outward from outer rim 106 and can include one or more individual leg posts or can include a plurality of sets of leg posts. In this example embodiment, interposed between each leg 104 on rim 106 is included an optional vent or opening 107 that provides venting and facilitates air flow from a lower part of dome housing 102 up to a dome apex or top or upper portion of dome housing 102 such that air flows up through a ventilation portion or vents 112 at the top of housing 102.

Housing 102 further includes at least one magnetic assembly 120 that is integrated into housing 102 for storing cover member 100 in microwave oven cavity 14 during non-use by attaching cover member 100 to upper surface 12 of microwave oven 10, as illustrated in FIG. 1C. In a related embodiment, where housing 102 is square or rectangular in shape, magnetic assembly 120 is located on a sidewall of housing 102 to thereby attach cover member 100 above plate 30 in a storage position. Housing 102 can have differing shapes to cover various heating plates and containers and can have one or more magnetic assemblies 120 place on the top or sidewalls to facilitate storage of the cover member within the microwave oven. In a related embodiment, cover member 100 includes a handle or grasping member 110 at the top of dome housing 102, which in this example embodiment is comprised of a combination of holes and ridges (or grip handles) that allow for grasping of the cover member by a user.

In a related embodiment cover member 100 has a set of legs/posts 104 that prop open the bottom of cover member 100 with a large circumferential air gap 107 all around the cover's base allowing for ample ventilation during cooking. In yet another related embodiment, vents 112 are located on a sidewall of (or additional vents are located on) dome housing 102 to form a venting system with vent 107 on the circumferential air gap.

Figure 2B:
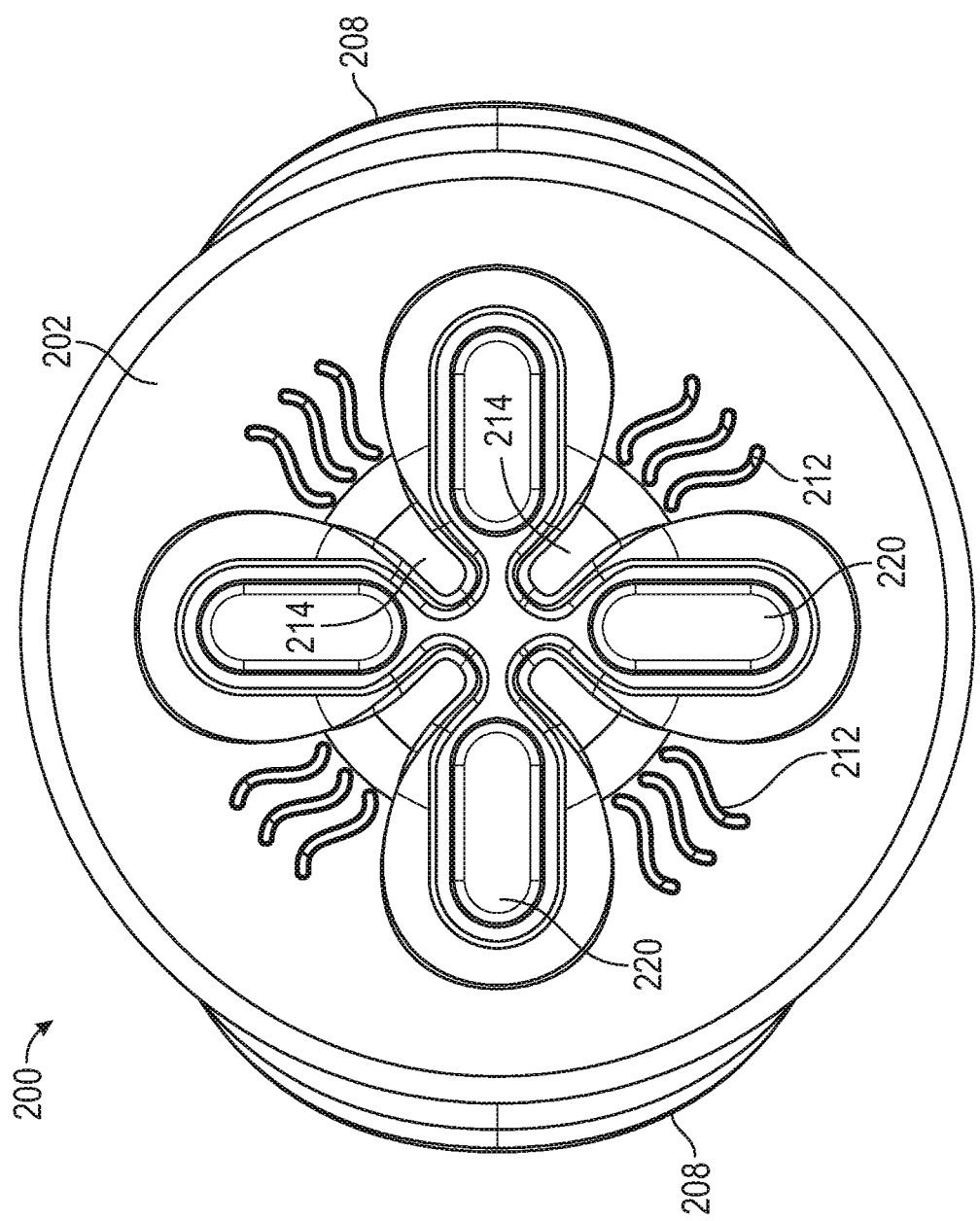
Figure 2C:
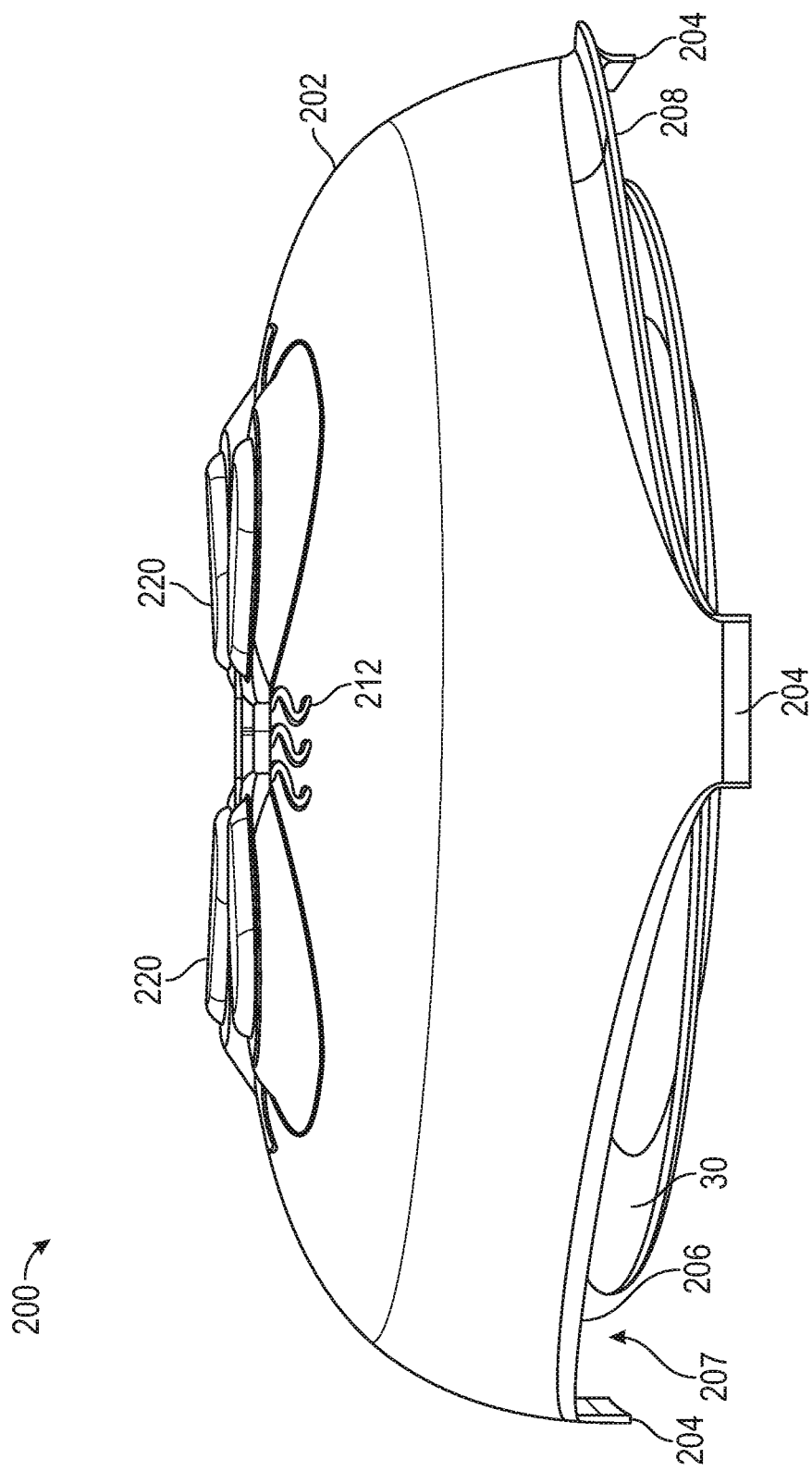

Referring now to FIGS. 2A-2C, there is illustrated another embodiment of a microwave cover member 200. In this particular embodiment, cover member 200 includes a dome-shaped housing 202 that includes at a concave periphery (away from the top of the dome) a set of leg posts 204 disposed on an outer rim 206 of dome housing 202. Leg posts 204 protrude outward from outer rim 206 and can include one or more individual leg posts or can include a plurality of sets of leg posts. In this example embodiment, interposed between each leg 204 on rim 206 is included an optional vent or opening 207 that provides venting and facilitates air flow from a lower part of dome housing 202 up to a dome apex or top or upper portion of dome housing 202 such that air flows up through a ventilation portion or vents 212 at the top of housing 202. Housing 202 further includes at least one magnetic assembly 220, which in this case includes multiple elements as shown, that is integrated into housing 202 for storing cover member 200 in microwave oven cavity 14 during non-use by attaching cover member to an interior upper surface 12 (but not necessarily limited to interior or upper surfaces) of a microwave oven.

Referring again to FIGS. 2A-2C, disposed on various sides of dome housing 202 are handles 208 that remain substantially cool to a user's touch and allows for easy grasping of cover member 200. Device 200 in this example embodiment has at least two grip handles 208 (on diametrically opposed sides of housing 202, but not necessarily limited to such a design or location) extending from or around outer rim 206 for easy lifting (or extending from another location of housing 202). In a related embodiment, device 200 includes at least one handle on housing 202 that extends laterally from rim 206 or extends away from housing 202 for easy griping. In this example embodiment, device 200 includes a two or more finger pinch grip handle arrangement 214 (comprised of at least two concave receptacles on top of housing 202, but can be four receptacles) for easy lifting of cover member 202 off of plate 30. In a related embodiment, cover member 200 includes a grasping member or hole (not shown) at or near the top of dome housing 202 to provide both for grasping of the cover member 200 as well as to provide ventilation of heat and steam generated during microwave heating. In yet another example embodiment the grasping member is comprised of a combination of holes and/or ridges (or grip handles or loops) that allow for grasping by a user.

Figure 3A:
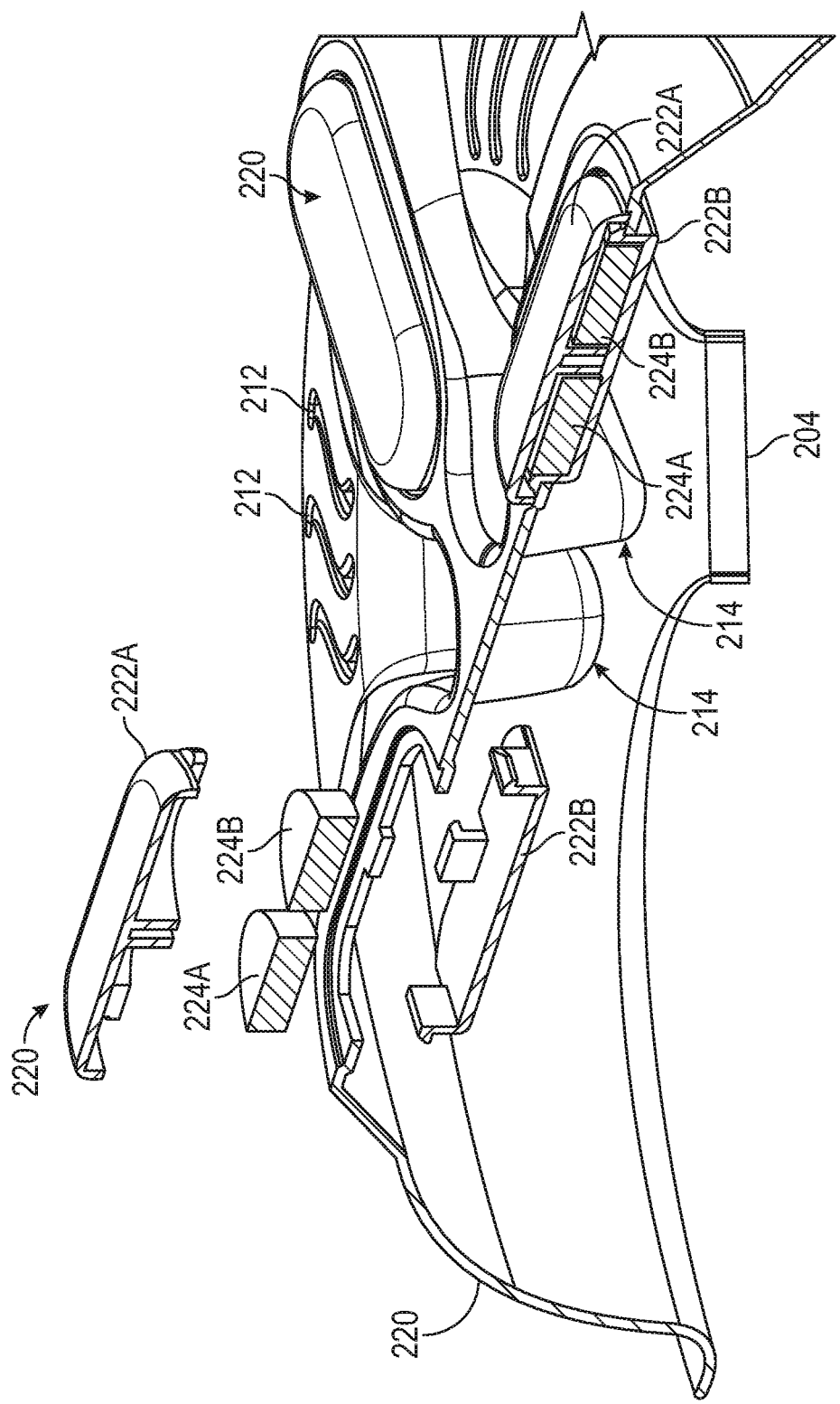
FIGS. 3A-3B illustrate a perspective cutaway view and a front cutaway view of the microwave cover member.
Figure 3B:
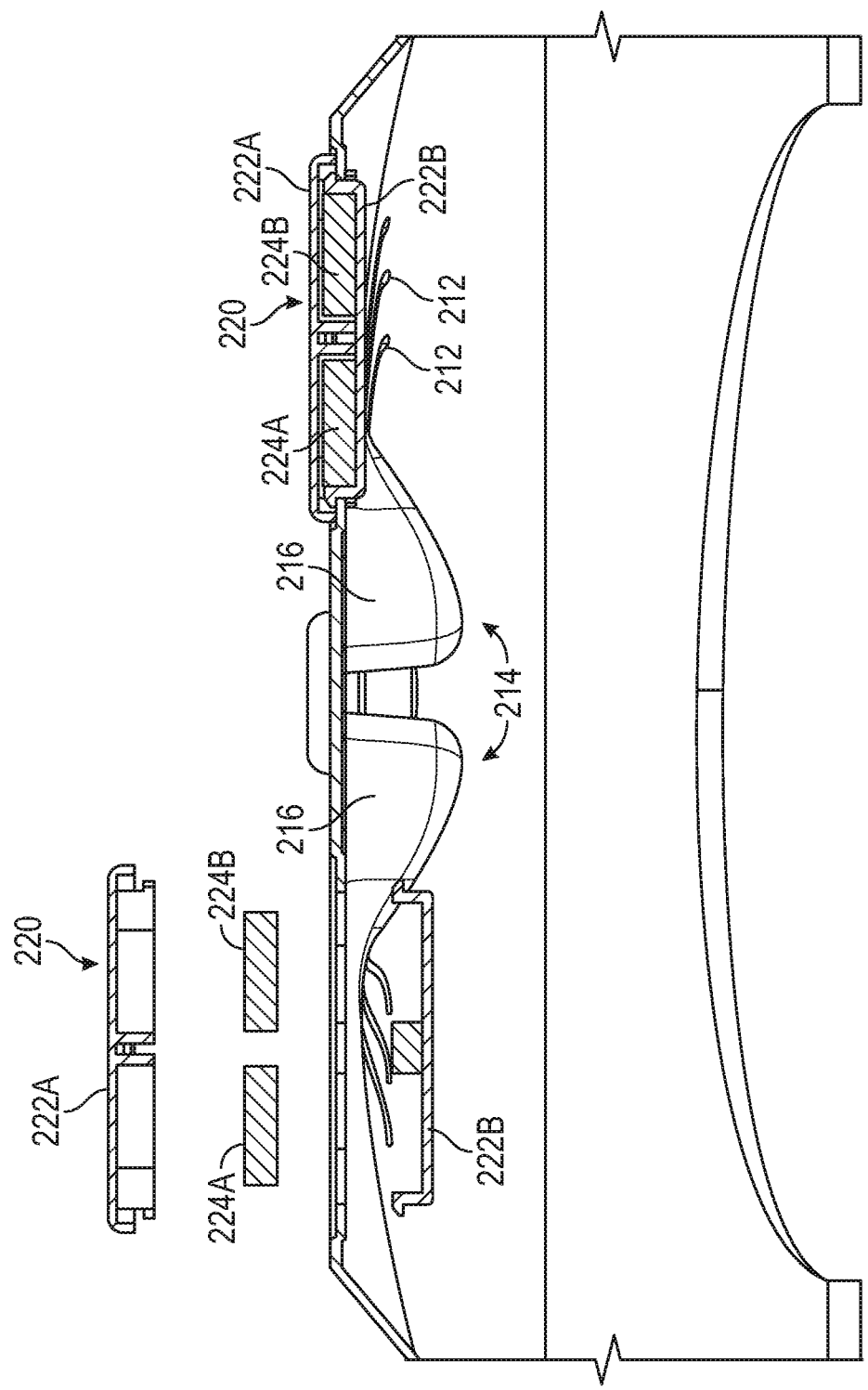
Figures 4A, 4B:
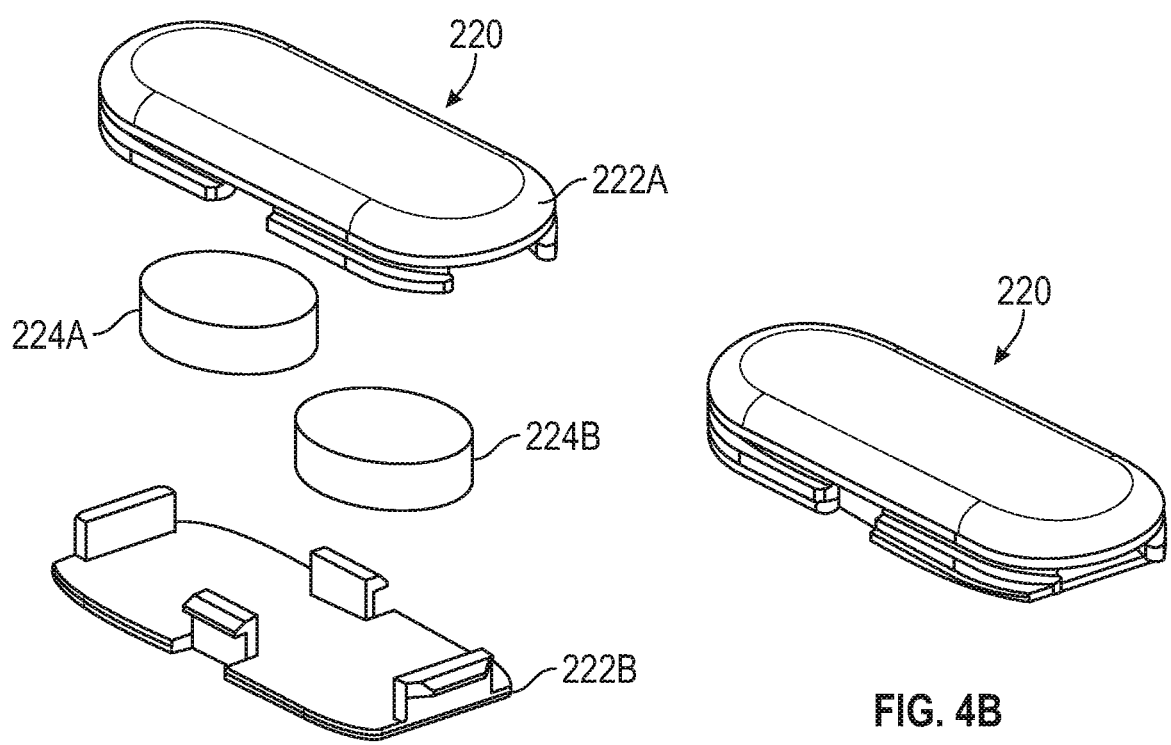
FIGS. 4A-4B illustrate perspective exploded and assembled views of an example magnetic assembly for use with a microwave cover or other kitchen accessories.

Referring now to FIGS. 3A-3B and 4A-4B, there is illustrated a perspective cutaway view and a front cutaway view of the microwave cover member 202 of FIG. 2 and an individual magnetic assembly 220. As illustrated in this example embodiment, cover member 200 stores inside housing 202 one or more semi-permanently affixed microwave-safe magnetic assemblies 220 at the top so as to magnetically adhere cover member 202 to the inside surface 12 (or any surface) of the microwave oven keeping the cover member lifted up and out of the way until the next use. In this example embodiment, magnetic assembly 220 includes a set of magnets 224A and 224B that are disposed within enveloping or encasing member 222 comprised of top 222A and bottom 222B, which in this case both halves snap-fit together as illustrated in FIGS. 4A and 4B to form magnet assembly 220. FIGS. 3A and 3B also illustrate one example of gripping concave receptacles 214 that are molded into the body of housing 202, similar to holes or apertures in a bowling ball, which allow a user to grasp cover member 202.

In this example embodiment, there are four receptacles each located between each set of magnetic assemblies 220. In yet another related embodiment, an optional pin hole in magnet chamber 222 of assembly 220 to drain moisture is included therein.

Figure 5A:
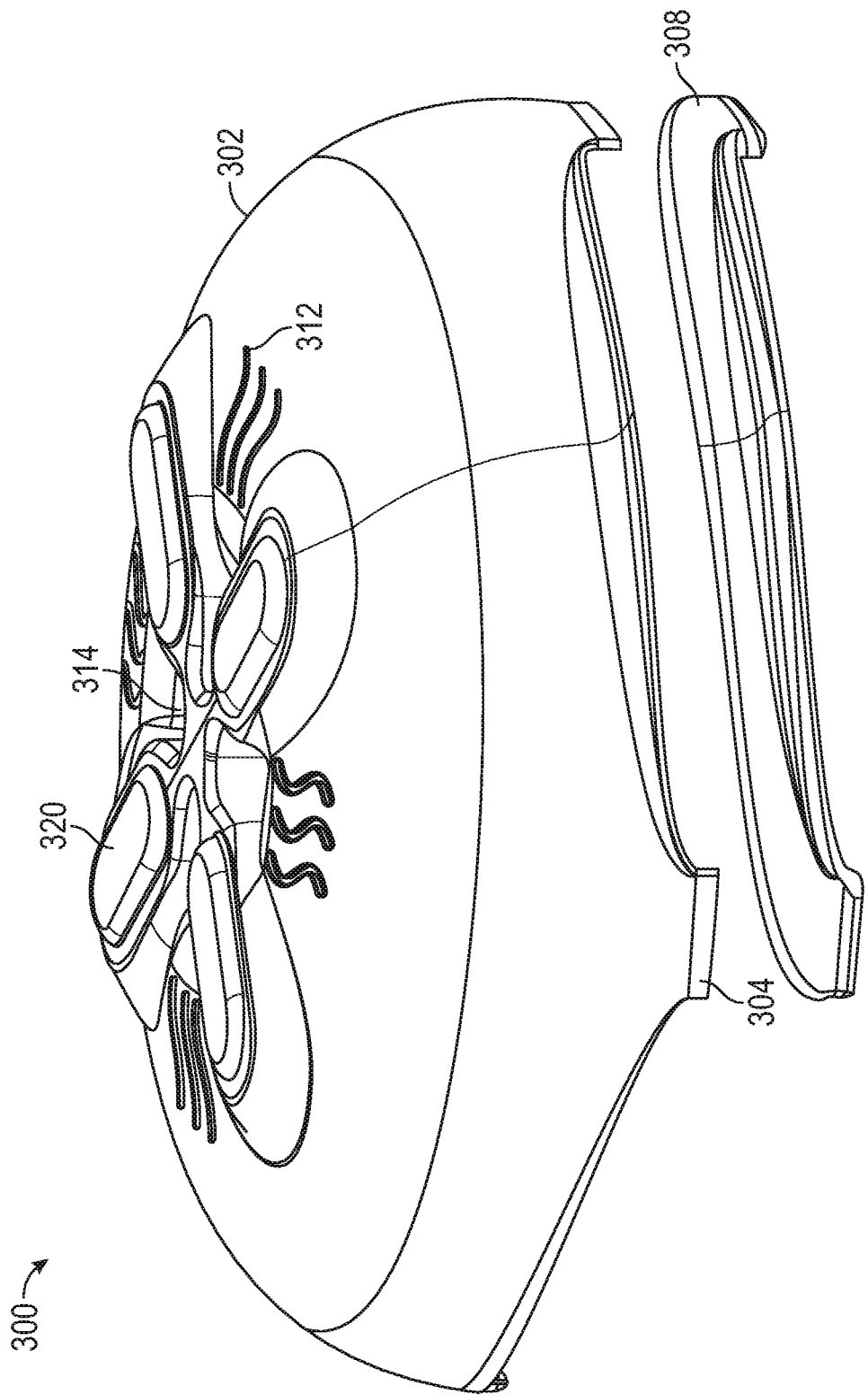
FIGS. 5A-5B illustrate an unassembled view and an assembled view, respectively, of a silicone handle assembly for use in connection with a microwave cover member.
Figure 5B:
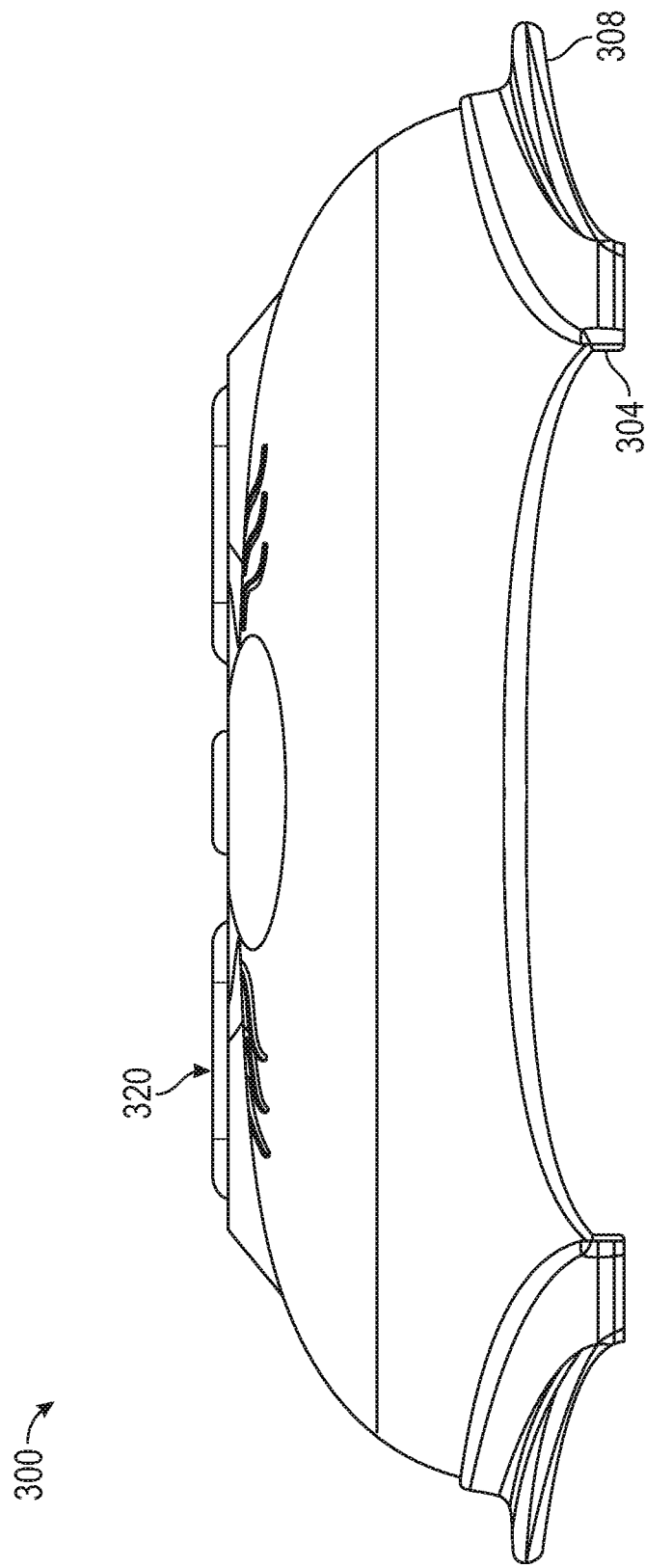

Referring now to FIGS. 5A-5B, there is illustrated an unassembled view and an assembled view, respectively, of a removable silicone handle assembly 308 for use in connection with another example embodiment of a microwave cover 300. Cover 300 includes many of the same components of both cover member 100 and cover member 200 hence there is no need to describe common components in cover member 300. In this example embodiment, removable silicone handle assembly 308 comprises a silicone sleeve that 'slips over' potential handles and/or leg posts 304 (and feet together), as shown in FIG. 5B. In a related embodiment, cover 300 includes overmolded handles and leg posts.

Figure 5C:
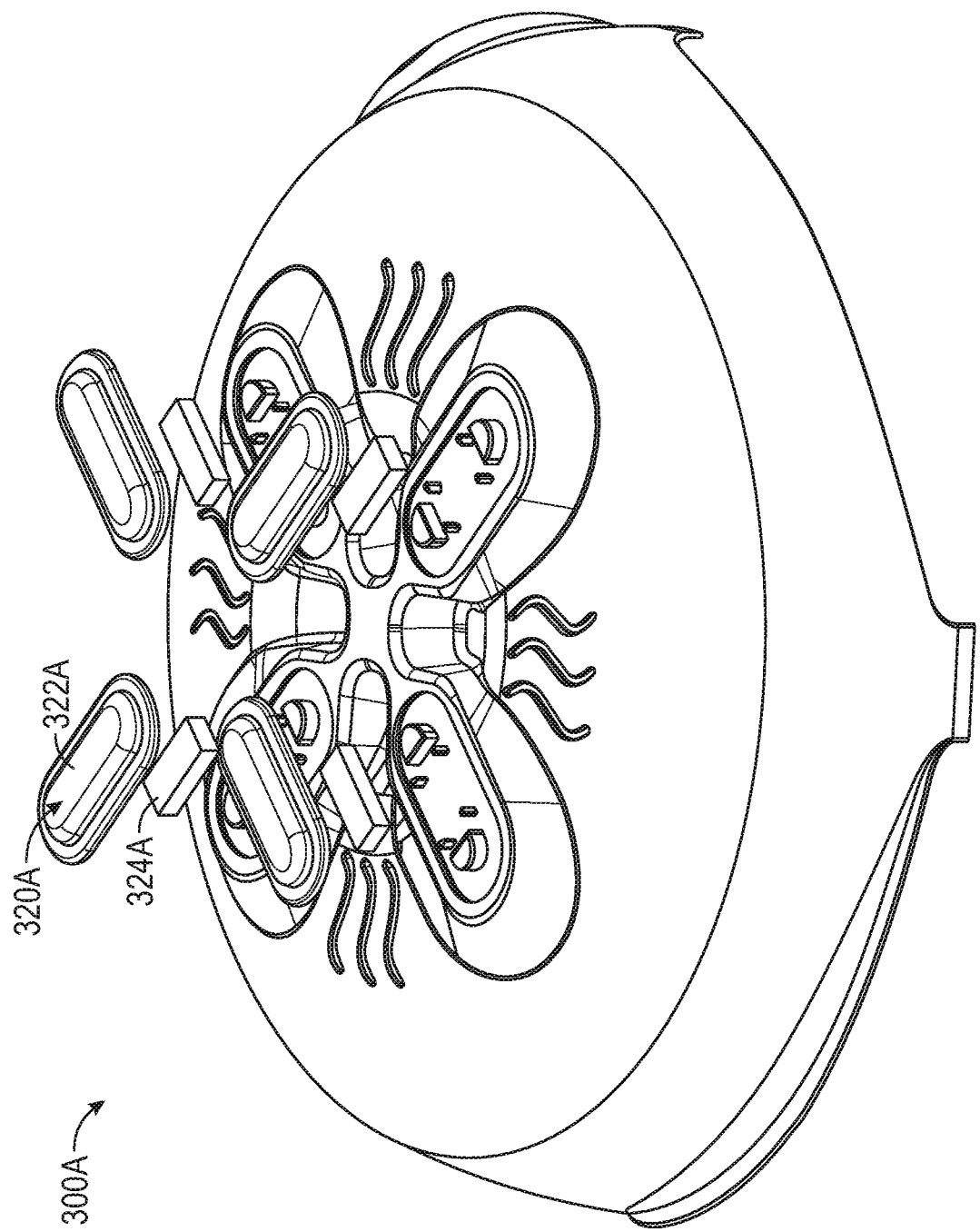
FIGS. 5C-5D illustrate an unassembled view and a cutaway perspective view, respectively, of a microwave cover member using insert molding techniques to encase or envelop a magnetic member into the cover member.
Figure 5D:
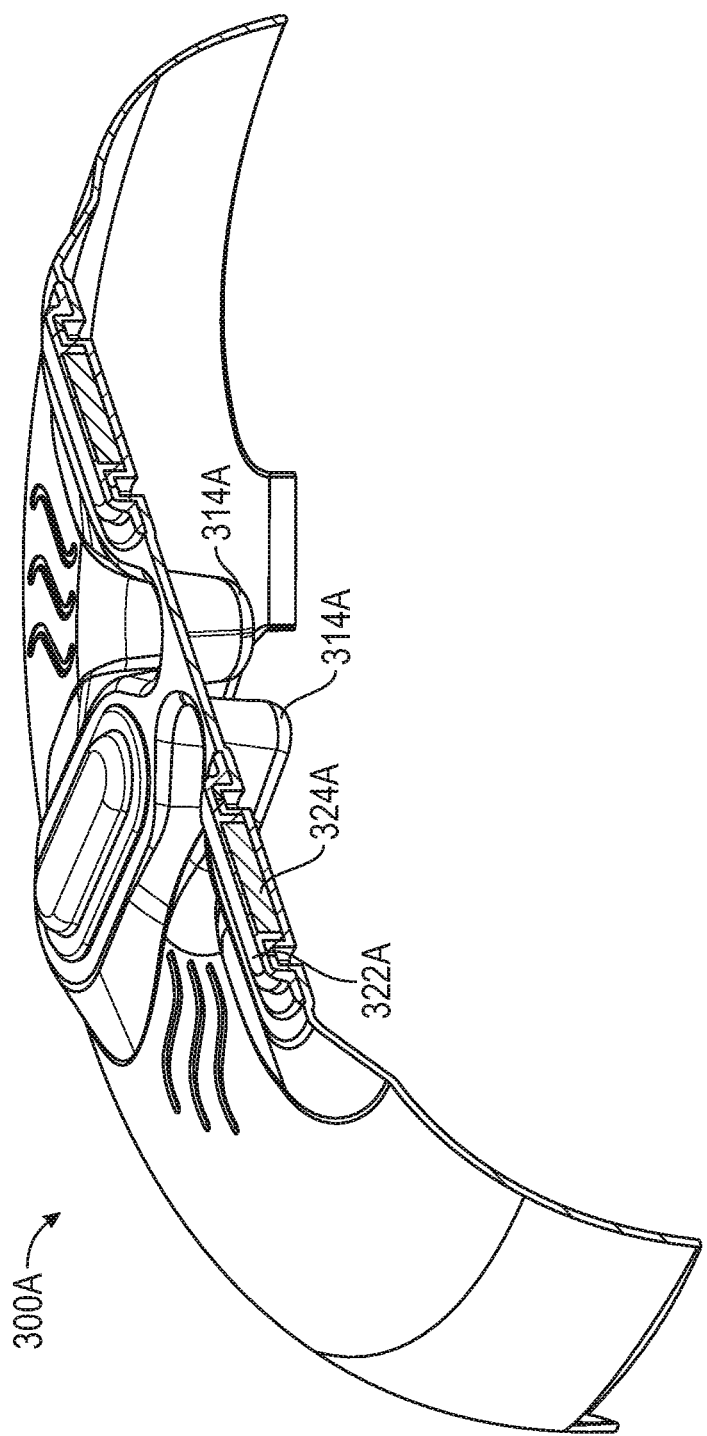

Referring now to FIGS. 5C-5D, there is illustrated an unassembled view and a cutaway perspective view, respectively, of a microwave cover member 300A using insert injection molding techniques to encase or envelop a magnetic member into the housing of the cover member. As part of cover member 300A, there is included a magnet assembly 320A that is formed from a cap or magnet cover 322A that encloses or encases a magnet 324A which serves as the insert that is placed into the injection mold prior to molding, after which melted plastic material is then injected into the mold to fill the cavity and mold around the inserted magnet 324A. FIG. 5D illustrates a cutaway view of the encased magnet 324A and also illustrates a partial view of a grasping receptacle 314A, which is meant to accommodate a user's finger.

Figure 5E:
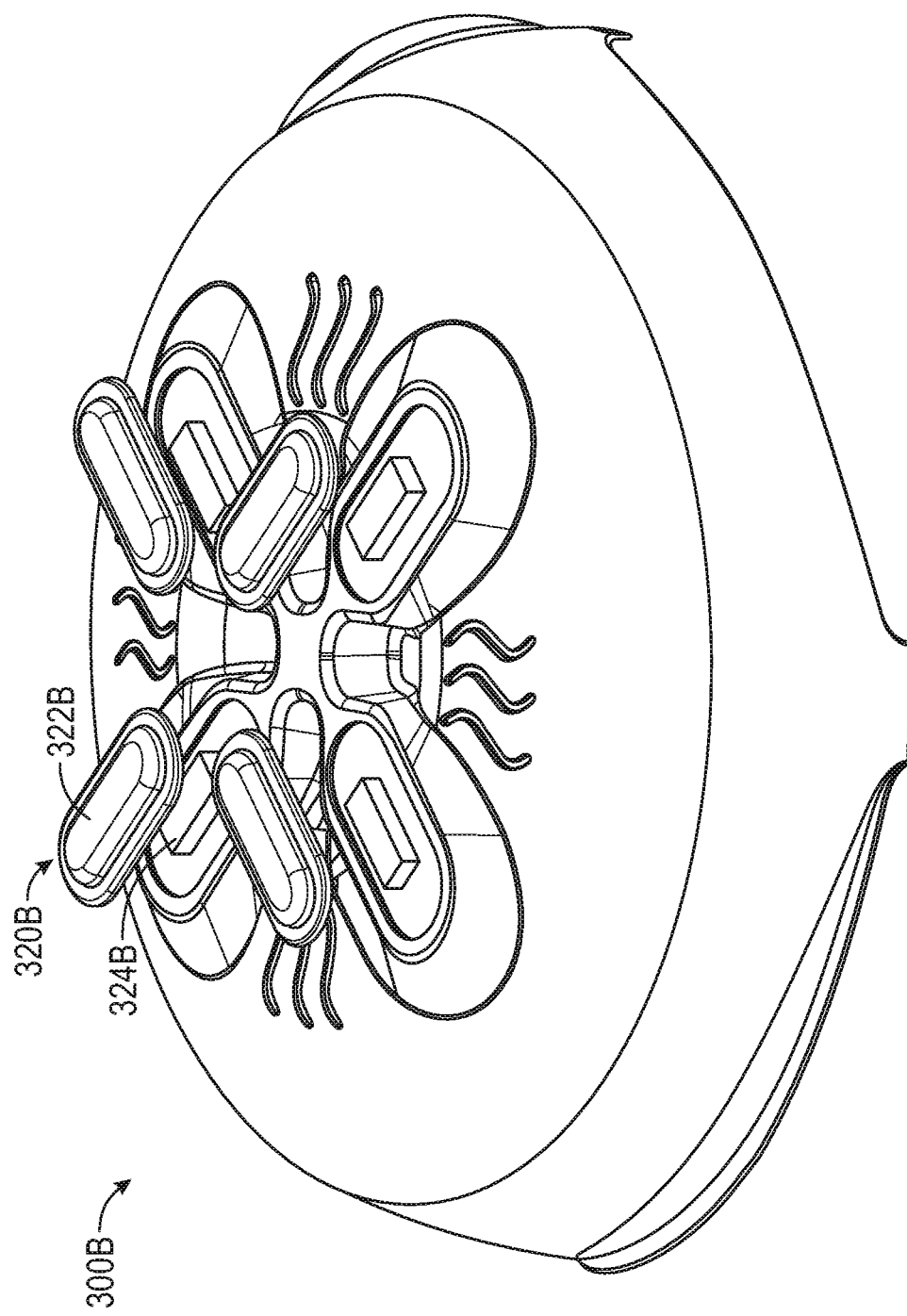
FIGS. 5E-5F illustrate an unassembled view and a cutaway perspective view, respectively, of a microwave cover member using ultrasonic welding techniques to encase or envelop a magnetic member into the cover member.
Figure 5F:
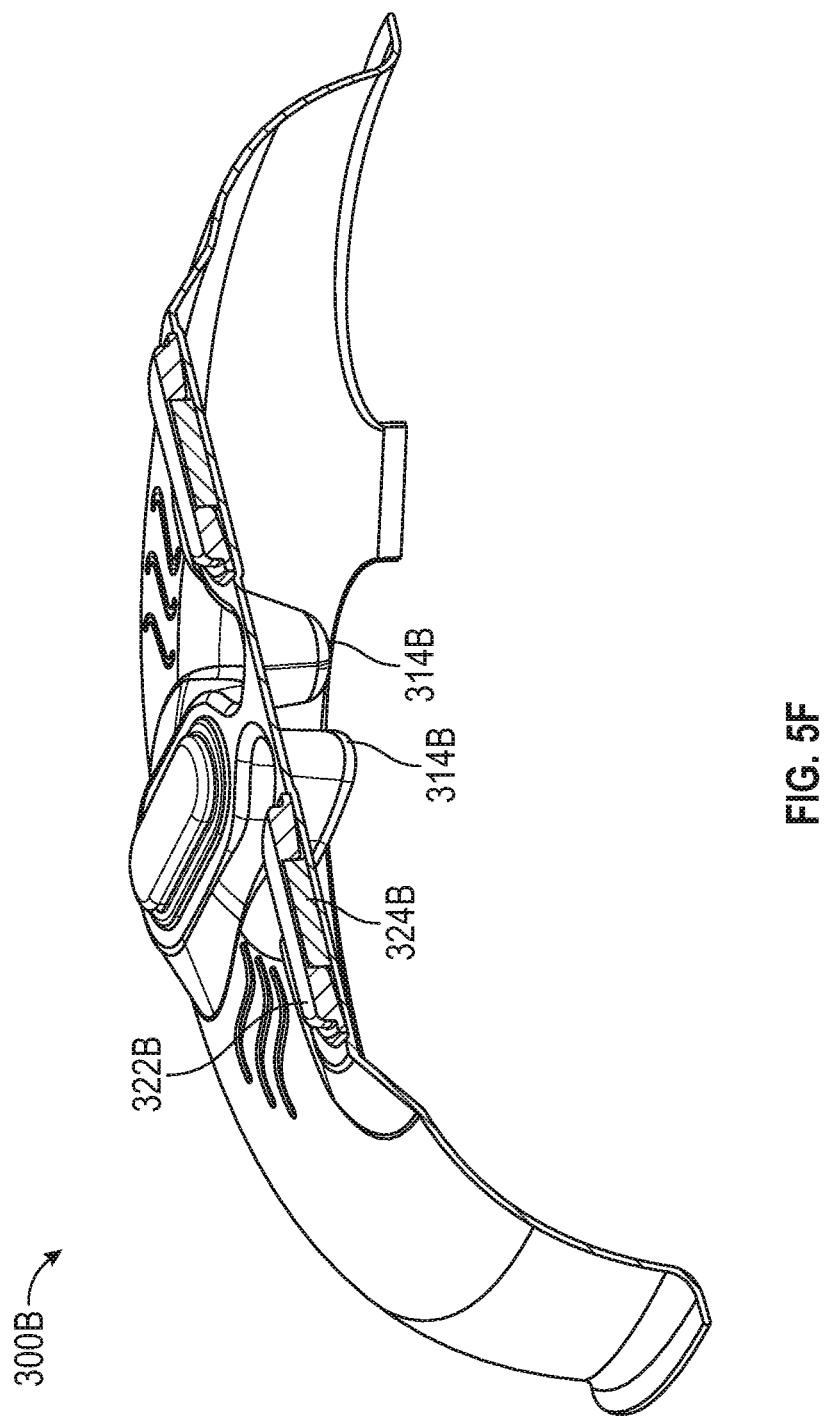
Figure 6A:
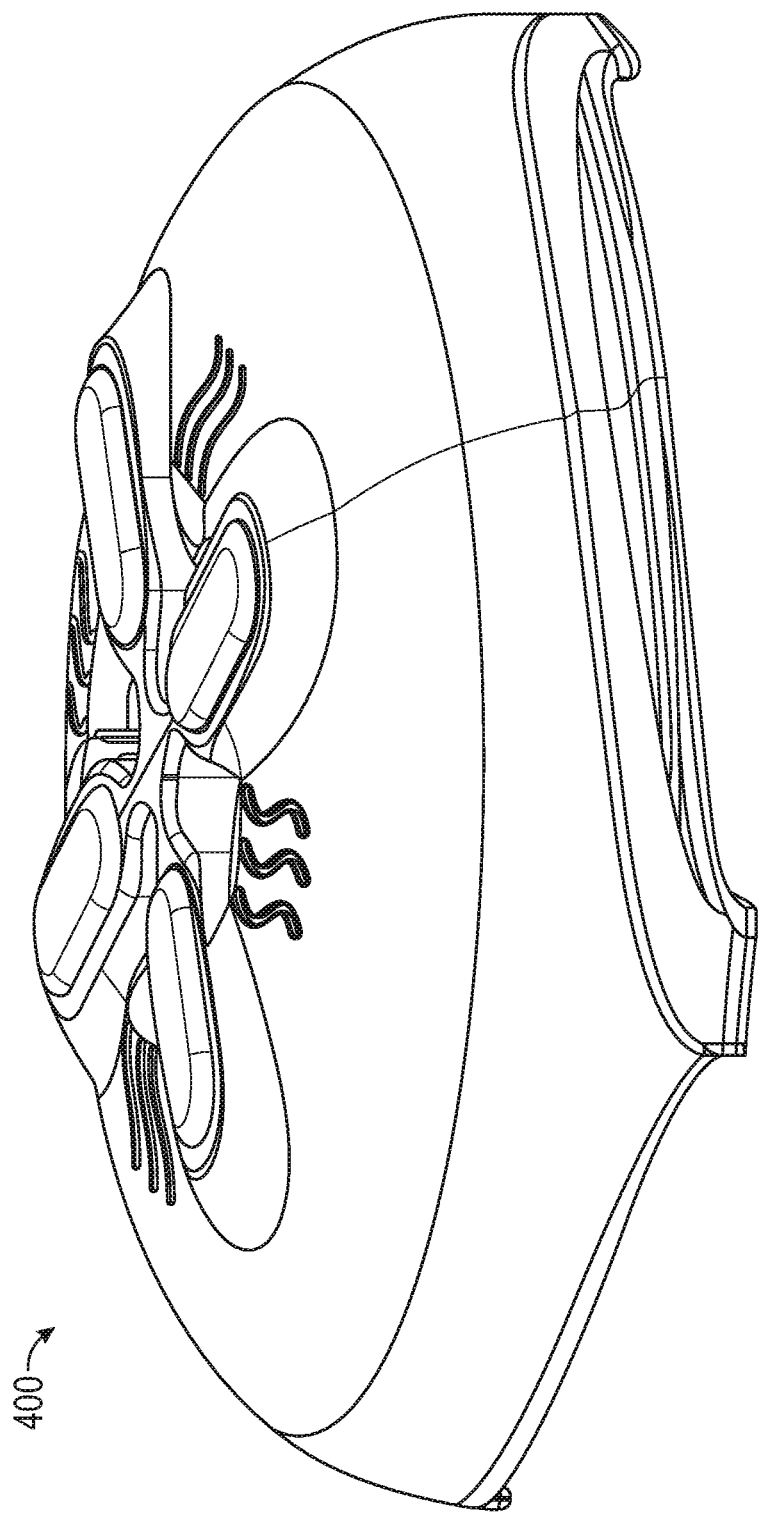
Figure 6B:
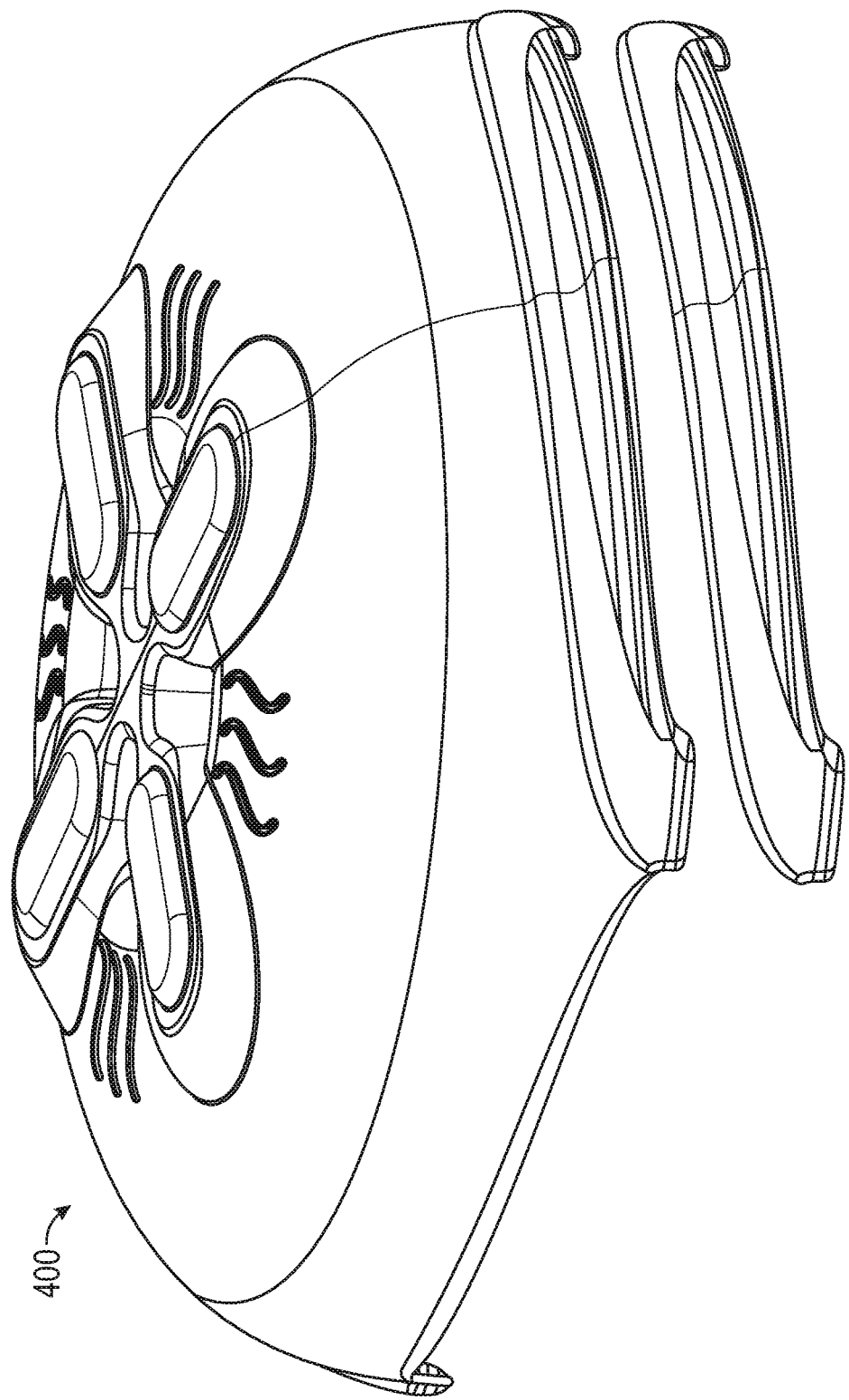
Figure 6E:
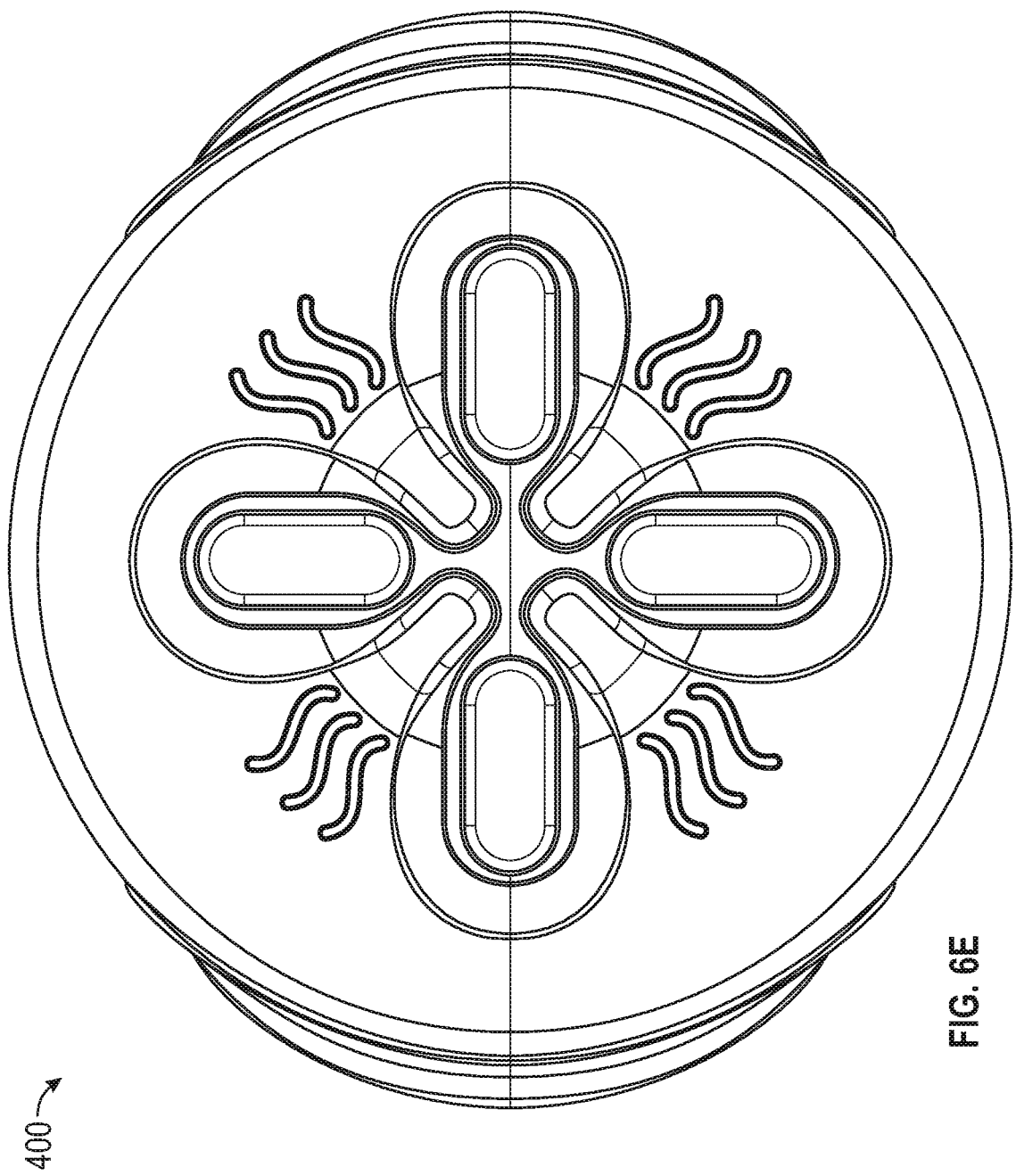
Figure 6F:
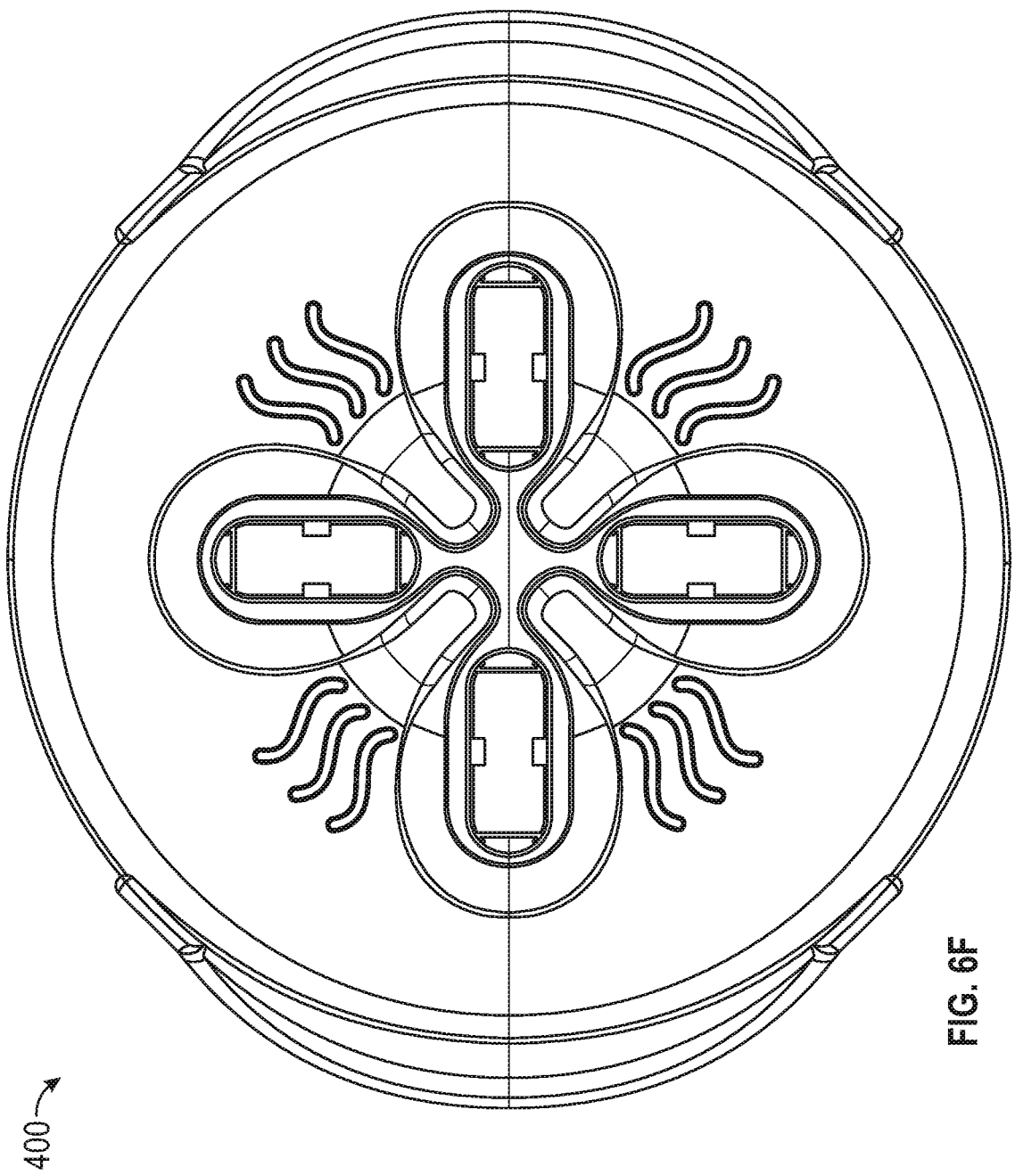
Figure 7A:
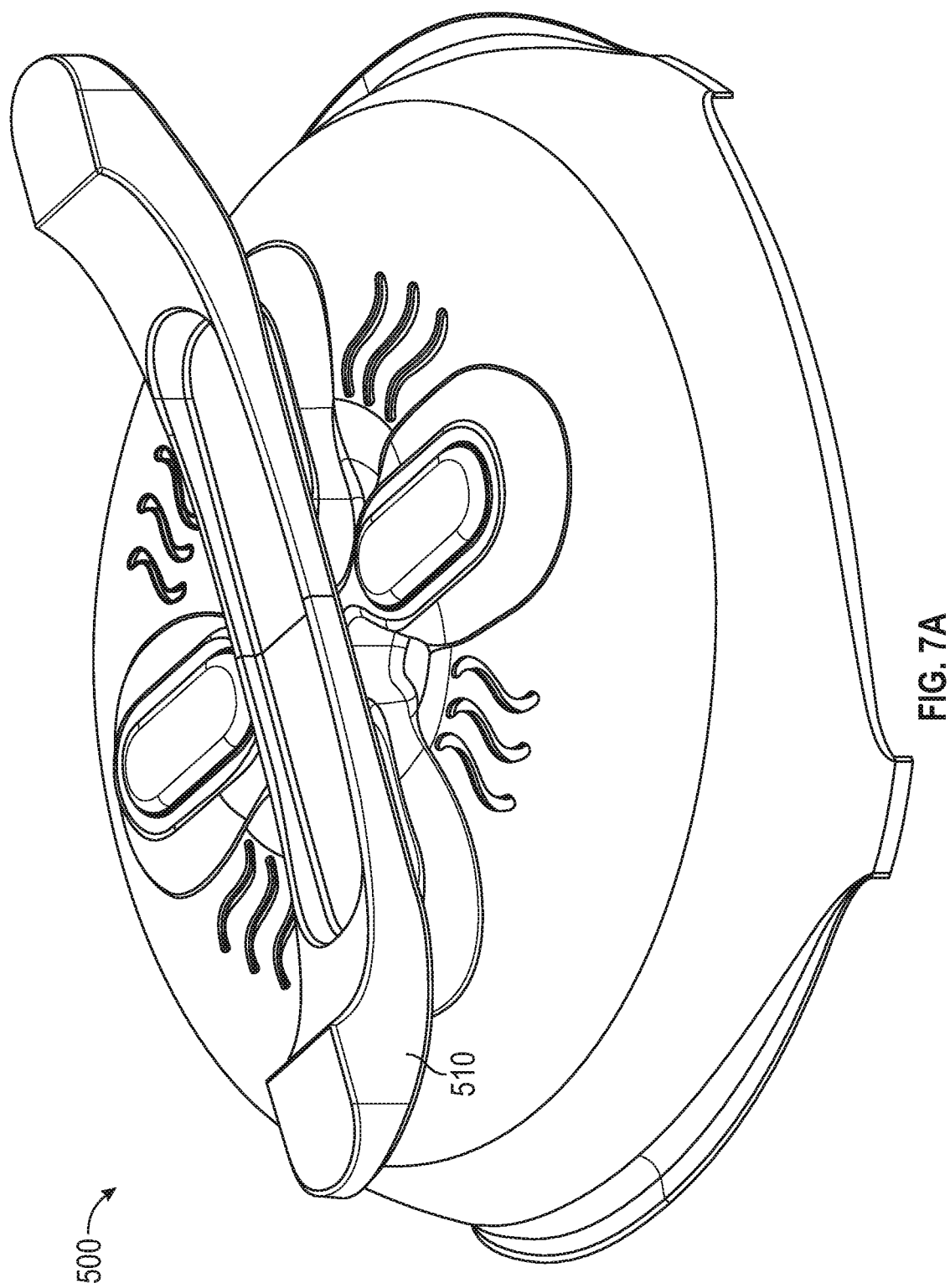
Figure 7B:
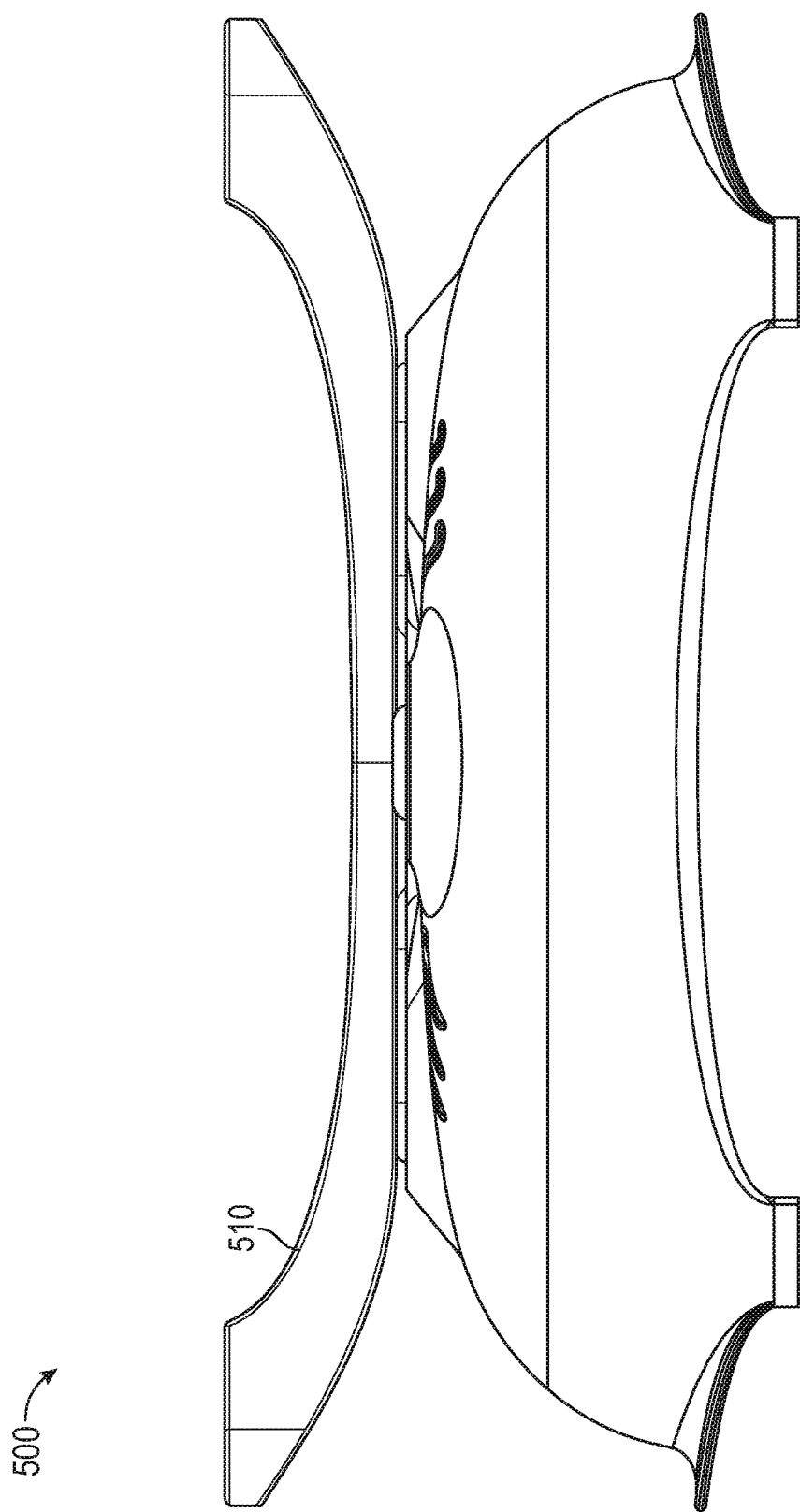
Figure 7D:
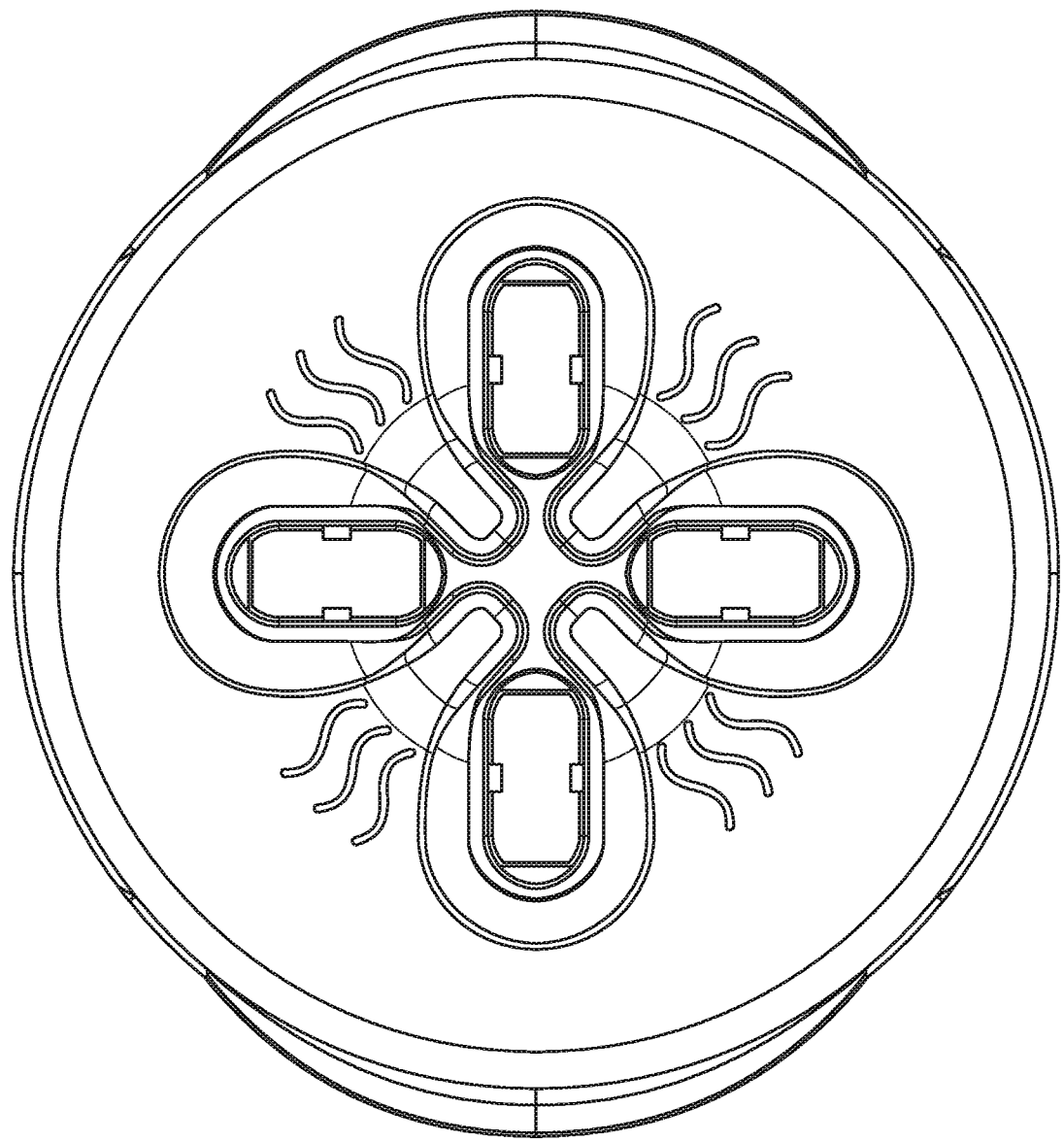

Referring now to FIGS. 5E-5F, there is illustrated an unassembled view and a cutaway perspective view, respectively, of a microwave cover member 300B using ultrasonic welding techniques to encase or envelop a magnetic assembly 320B having a magnetic member 324B (and a cover or cap 322B) into the housing body of the cover member. Sonic welding or ultrasonic plastic welding of magnetic member 324B is performed by the joining or reforming of thermoplastics through the use of heat generated from high-frequency mechanical motion. It is accomplished by converting high-frequency electrical energy into high-frequency mechanical motion. That mechanical motion, along with applied force, creates frictional heat at the plastic components' mating surfaces (joint area) around cover 322B so the plastic material will melt and form a molecular bond between the cover 322B and magnetic member 324B. FIG. 5F illustrates a cutaway view of the encased magnet 324B and also illustrates a partial view of a grasping receptacle 314B, which is meant to accommodate a user's finger. In any embodiment described herein, the magnet (such as magnet 324A or 324B for example) is shielded, which includes a metal screen encasing a magnet, or a metal cap enclosure, or a metal foil wrapped around magnet, or a metal coated magnet, which create a 'Faraday Cage' or 'Faraday Shield' effect which shields the magnet from radio frequency (RF) or electromagnetic energy or waves (e.g., microwaves). This is all performed before the magnetic element is encased into the housing of the cover member.

Referring now to FIGS. 6A-6F, there is illustrated another embodiment of cover member 400. There is illustrated herein a perspective, exploded, front, side, top and bottom views, respectively, of another embodiment of a microwave cover member 400. Like components as with other cover member embodiments are not described herein for purposes of expediency.

Referring now to FIGS. 7A-7D, there is illustrated another embodiment of cover member 500 with a supplemental support member 510 for non-conforming microwave ovens. Like components as with other microwave cover member embodiments are not described herein for purposes of expediency. In particular, a perspective view, a front view, a side view and a bottom view illustrate microwave cover member 500 with a supplemental support member 510 that is installed or affixed permanently (or affixed temporarily depending on the microwave oven design) onto an interior surface of the microwave oven. Support member 510 thus acts as a location to store the microwave cover member 500 within the microwave oven for those microwave ovens that have interior surfaces in which the cover member 500 cannot be affixed or stored (or for use in nonconforming microwave oven interior surfaces). In this example embodiment, supplemental support member 510 provides a mounting or support surface for the magnetic assembly of the housing member. In a related embodiment, support member 510 serves as a storage device for cover member 500 where the cover member housing includes a snap-fit structure formed therein (on a surface) instead of a magnetic assembly such that the housing snaps onto support member 510, without the use of a magnet or magnetic assembly, for storage when not in use. Likewise, other kitchen accessories can also be snap-fit onto support member 510 for storage when a magnetic assembly is not used on the kitchen accessory.

In yet another embodiment, a magnet assembly for use with a microwaveable cooking accessory is provided that includes at least one magnet member and includes an enveloping member adapted to envelop the at least one magnet member, the enveloping member together with the magnet member adapted to be integrated with an outer surface of the microwave cooking accessory. In this example embodiment, the magnet member is comprised of material or alloy selected from the group consisting of neodymium, alnico, ceramic, samarium cobalt, strontium, barium and ferrite. In a related embodiment, the magnetic member is a strontium flexible magnetic element that is adhered to, clipped in or molded into the cover member. The enveloping member is selected from the group consisting of a heat resistant plastic housing, a ceramic housing, a metal foil cover or coating, and a metal mesh.

In related embodiments, the shape of the cover member includes square, oval, rectangular and is not limited to a dome shape. In addition, in related embodiments, the material of the cover member is not just limited to plastic and includes other microwave and standard oven safe materials such as metal, glass, aluminum, cardboard, ceramic and silicone. Attachment assemblies are not just limited to microwave-safe and electromagnetically-safe-magnets and include, but are not limited to, suction cups, mechanical fasteners (such as hook and loop fasteners or snap buttons) and light adhesives that are microwave and heat resistant.

In yet other related embodiments, microwave or oven-safe fasteners are integrated into other kitchen accessories such as kitchen utensils (spoons, forks, knives, spatulas, tongs, strainers, colanders, etc.) that can be located within or about the microwave oven or regular electric/gas oven.

The following patents are incorporated by reference in their entireties: U.S. Pat. Nos. 2,731,663; 7,326,895; 7,482,561; 7,766,181 and 8,866,055.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A cover member assembly for use in a microwave oven comprising:
    a housing member configured for covering a food item during microwave cooking, the housing member with an open end having an outer rim adapted to support the housing member in a face-down configuration, the housing further including at least one ventilation portion to permit air flow, wherein the outer rim includes a set of leg posts protruding therefrom configured to facilitate air flow up through the housing member; and
    at least one magnetic member integrated into the housing member, the at least one magnetic member configured to facilitate adhering of the housing member to an interior surface of a microwave oven, the at least one magnetic member comprising a magnet and an enveloping member, wherein the enveloping member further comprises one of a metal foil or metallic coating configured to shield the magnet during microwave cooking of the food item.

2. The cover member according to claim 1 wherein the enveloping member is selected from the group consisting of one or more of the following materials: plastic, silicone, and metal mesh.

3. The cover member according to claim 2 further including at least one silicone member adapted to be located on or about the outer rim and about the set of leg posts.

4. The cover member according to claim 1 further comprising a plurality of magnetic members integrated into an upper portion of the housing member.

5. The cover member according to claim 1 wherein the ventilation portion comprises a plurality of vents disposed about an upper portion of the housing member.

6. The cover member according to claim 1 wherein the outer rim includes at least one handle located on or about the outer rim that extends laterally out from about the outer rim.

7. The cover member according to claim 1 wherein an upper portion of the housing includes at least two formed concave receptacles adapted for gripping the housing when the open end of the housing is in a face-down position.

8. The cover member according to claim 1 wherein an upper portion of the housing includes at least one formed receptacle adapted to receive the magnetic member.

9. The cover member according to claim 1 further comprising a supplemental support member configured to be affixed to an interior surface of the microwave oven and configured to provide a mounting or support surface for the magnetic member of the housing member.

10. The cover member according to claim 1 wherein the magnetic member comprises a magnetic member assembly including at least one magnet member comprised of a strontium flexible magnet material and an enveloping member configured to envelop the magnet member.

11. The magnetic member according to claim 1 wherein the magnetic member is comprised of material selected from the group consisting of neodymium, alnico, ceramic, samarium cobalt, strontium, barium, ferrite and a flexible magnetic material.

12. A cover member for use in a microwave oven comprising:
- a housing member configured for covering a food item during microwave cooking, the housing member having a closed end and a lower portion with an open end; and
- at least one magnetic assembly integrated into the closed end of the housing, the at least one magnetic assembly configured to facilitate adhering of the housing member to an interior surface of the microwave oven, the at least one magnetic assembly comprising a magnet member and an enveloping member, wherein the enveloping member further comprises one of a metal foil or metallic coating configured to shield the magnet member during microwave cooking of the food item.

13. The cover member according to claim 12 wherein the closed end of the housing member has at least one aperture or hole adapted to permit airflow through the closed end of the housing.

14. The cover member according to claim 12 wherein the open end includes an outer rim having at least two leg posts configured to support the housing member on a flat surface and configured to facilitate air flow through the housing member.

15. The cover member according to claim 14 wherein the outer rim includes at least one handle located on or about the outer rim that extends laterally out from about a side of the outer rim.

16. The cover member according to claim 14 further including at least one silicone member adapted to be located on or about the outer rim and about the leg posts.

17. The cover member according to claim 12 wherein an upper portion of the closed end of the housing includes at least two formed concave receptacles located adjacent to the at least one magnetic assembly and configured for gripping the housing when the open end of the housing is in a face-down position.

18. The cover member according to claim 12 wherein the magnetic assembly further comprises at least one magnet member and an enveloping member adapted to envelop the magnet member.

19. The cover member according to claim 18 wherein the closed end of the housing includes a formed receptacle adapted to receive the magnetic assembly.

20. The magnet assembly according to claim 12 wherein the magnet member is comprised of material selected from the group consisting of neodymium, alnico, ceramic, samarium cobalt, strontium, barium, ferrite and a flexible magnetic material.

21. The cover member according to claim 12 further comprising a supplemental support member configured to be affixed to an interior surface of the microwave oven and configured to provide a mounting or support surface for the magnetic assembly of the housing member.

* * * * *